UNITED STATES PATENT OFFICE.

EMIL ELSAESSER, OF BARMEN, GERMANY, ASSIGNOR TO DAHL & CO., OF SAME PLACE.

BROWN DYE AND PROCESS OF MAKING IT.

SPECIFICATION forming part of Letters Patent No. 611,111, dated September 20, 1898.

Application filed December 21, 1897. Serial No. 662,919. (No specimens.) Patented in Germany July 19, 1897, No. 95,758.

*To all whom it may concern:*

Be it known that I, EMIL ELSAESSER, a subject of the King of Würtemberg, residing in Barmen, Germany, have invented certain new and useful Improvements in the Process of Making New Substantive Cotton Dyestuffs, of which the following is a specification.

This invention relates to a process of making new substantive cotton dyestuffs.

My invention, which has been patented in the German Empire, (D. R. P. No. 95,758, dated July 19, 1897,) is based on the hitherto-undiscovered fact that the sodium-bisulfite compound of alpha-nitroso-beta-naphthol in an acetic-acid solution combines with such a tetrazo compound as tetrazo-diphenyl and tetrazo-ditolyl, whereby an intermediate product is formed which contains a free diazo group and consequently can be further combined in either an acid or an alkaline solution with amins and naphthols or their sulfonic acids, thus forming diazo dyestuffs which dye cotton in alkaline or neutral baths without a mordant. The process of making such dyestuffs is as follows: 18.6 kilograms of benzidin or 21.2 kilograms of tolidin are transformed into a tetrazo compound (tetrazo-diphenyl or tetrazo-ditolyl) by means of seventy kilograms of hydrochloric acid (of thirty per cent. HCl strength) and fourteen kilograms of sodium nitrite. At the same time twenty-eight kilograms of the sodium-bisulfite compound of alpha-nitroso-beta-naphthol and sixty kilograms of sodic acetate are dissolved in two hundred liters of water cooled down with ice to 10° centigrade, and the tetrazo compound is slowly poured in under constant stirring. The formation of the red intermediate product, which separates out itself, is completed in about three or four hours. In the meantime a solution of twenty-four kilograms of beta$_1$ amido alpha$_4$ naphthol beta$_3$ monosulfonic acid ($NH_2,OH,SO_3H$, beta$_1$, alpha$_4$, beta$_3$) and forty kilograms of caustic soda in two hundred liters of water has been prepared and by means of ice cooled down to 10° centigrade.

As soon as the intermediate product is ready it is allowed to flow into the solution of the amidonaphthol sulfonic acid while being well stirred. The combination which forms the diazo dyestuff follows immediately. The thus prepared dyestuff is precipitated with salt, filtered off, pressed, and dried, and then forms a dark color, which readily dissolves in water to a bordeaux-red color if tetrazo-diphenyl was used and to a reddish-violet color if tetrazo-ditolyl was used. In an aqueous solution of the powder dilute sulfuric acid produces a violet precipitate. In concentrated sulfuric acid the dyestuff dissolves with a blue color. The addition of water to the sulfuric-acid solution produces first a violet solution and then a brown-violet precipitate. Unmordanted cotton is dyed by the dyestuff dark brown in a neutral or alkaline bath. The dyestuff can be diazotized on the fibers and combined with amins and naphthols, whereby new color effects are obtained.

I claim as my invention and desire to secure by Letters Patent—

1. The process of making a brown diazo dyestuff for dyeing cotton, by combining the sodium-bisulfite compound of nitroso-beta-naphthol in an acetic-acid solution with a tetrazo compound, such as tetrazo-diphenyl and tetrazo-ditolyl, and then combining the intermediate product thus formed with an alkaline solution of beta$_1$ amido alpha$_4$ naphthol beta$_3$ sulfonic acid.

2. A brown dyestuff in the form of a dark powder derived from a combination of the sodium-bisulfite compound of nitroso-beta-naphthol with a tetrazo compound and beta$_1$ amido alpha$_4$ naphthol beta$_3$ sulfonic acid, the said dyestuff, readily dissolving in water, being soluble in sulfuric acid with a blue color and on the addition of water to its sulfuric-acid solution a brown-violet precipitate is thrown down, and dyeing unmordanted cotton in a neutral or alkaline bath dark brown.

In testimony whereof I have signed my name to this specification in the presence of two subscribing witnesses.

EMIL ELSAESSER.

Witnesses:
   R. E. JAHN,
   OTTO KÖNIG.